A. C. Thomas,
Rat-Trap.

N° 74,256. Patented Feb. 11, 1868.

Ground Plan.

Witnesses:
Benj. F. Zehrung
Cornelius Thomas

Inventor:
Allen C. Thomas

A. C. Thomas,
Rat-Trap.
N° 74,256. Patented Feb. 11, 1868.
Fig. 3. Elevation.
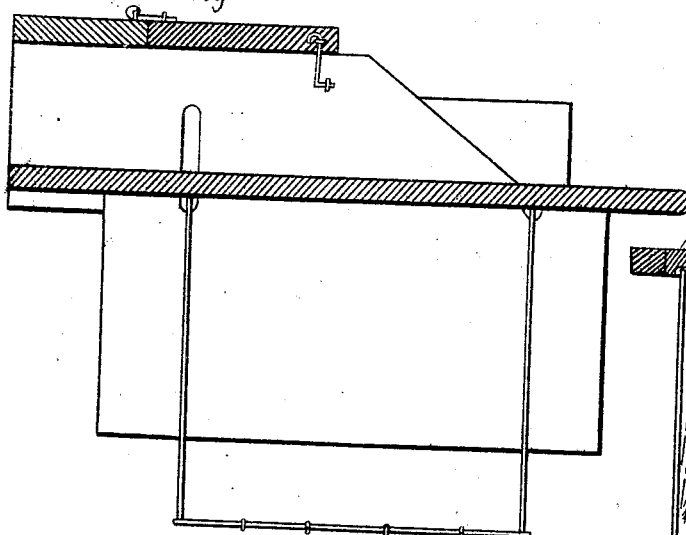
Fig. 5 Section N.N.
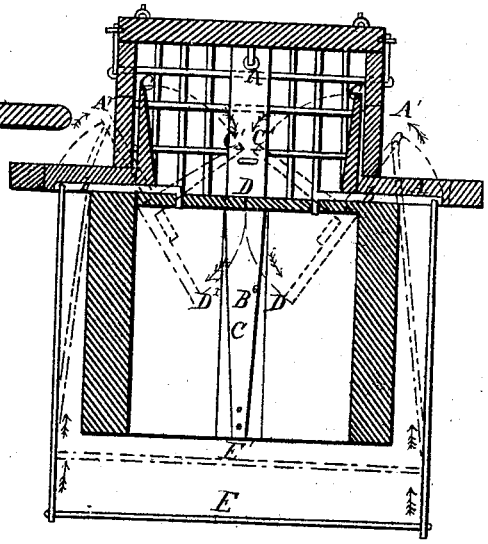
Fig. 4. Section M.M.
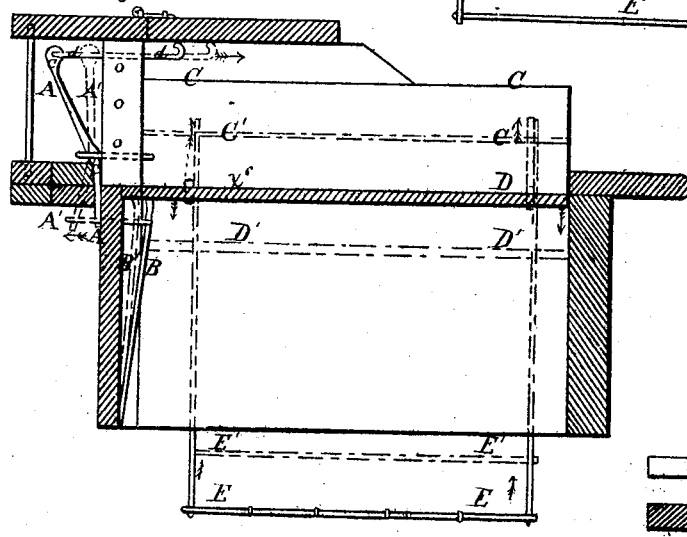
☐ Wood
▨ Wood in Section
☐ Iron
Scale. 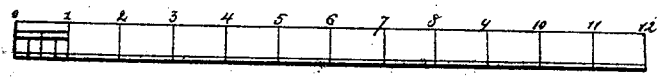 Inch.
Witnesses:
Benj. F. Zehring
Cornelius Thomas
Inventor:
Allen C. Thomas

United States Patent Office.

ALLEN C. THOMAS, OF CAMP CHARLOTTE, OHIO.

*Letters Patent No. 74,256, dated February 11, 1868.*

IMPROVED ANIMAL-TRAP.

*The Schedule referred to in these Letters Patent and making part of the same.*

TO ALL WHOM IT MAY CONCERN:

Be it known that I, ALLEN C. THOMAS, of Camp Charlotte, Salt Creek township, Pickaway county, and State of Ohio, have invented a new and useful Trap for Catching Rats or other Animals; and I do hereby declare that the following is a full, clear, and exact description of the construction and operation of the same, reference being had to the annexed drawings, making a part of this specification, in which—

Figure 3 is a side view,

Figure 4 is a descriptive view of the working of the trap, and so is

Figure 5, showing the end.

Figure 1:
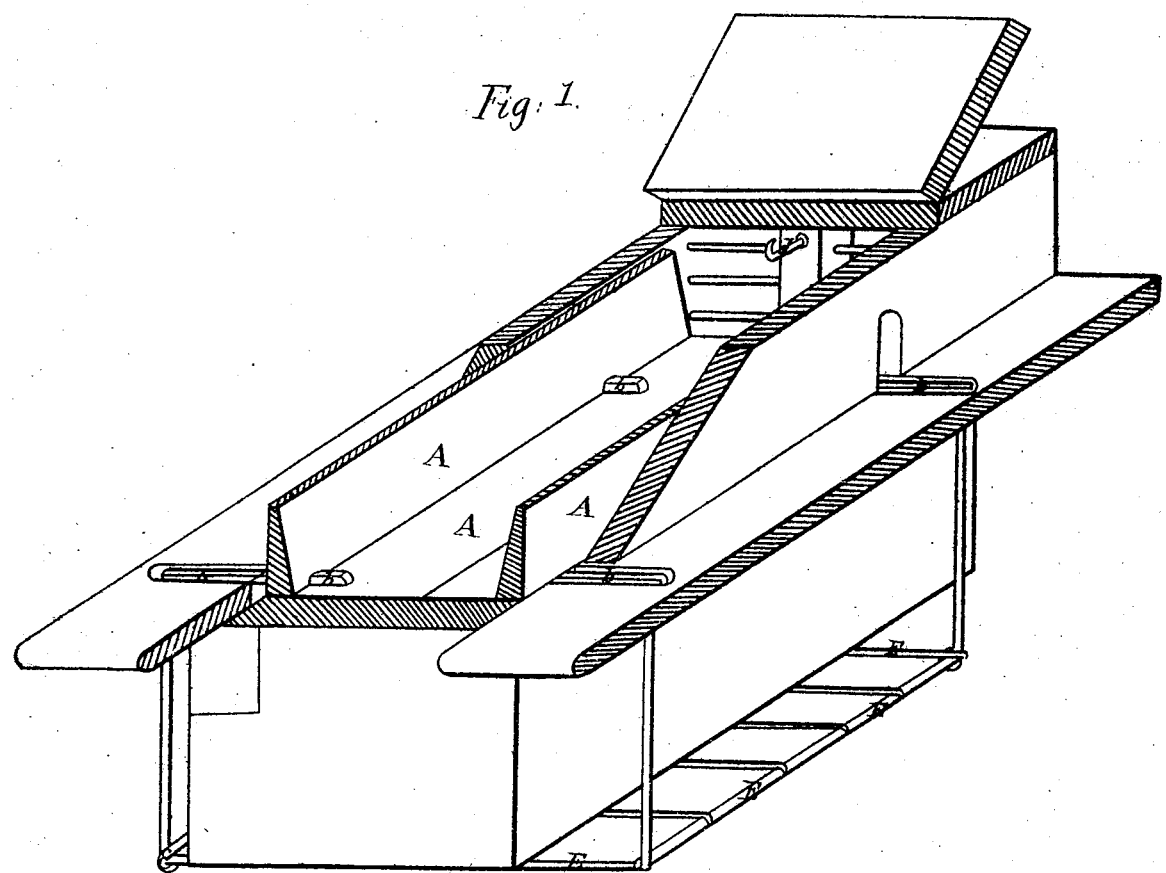
Figure 1 is a perspective view.
Figure 2:
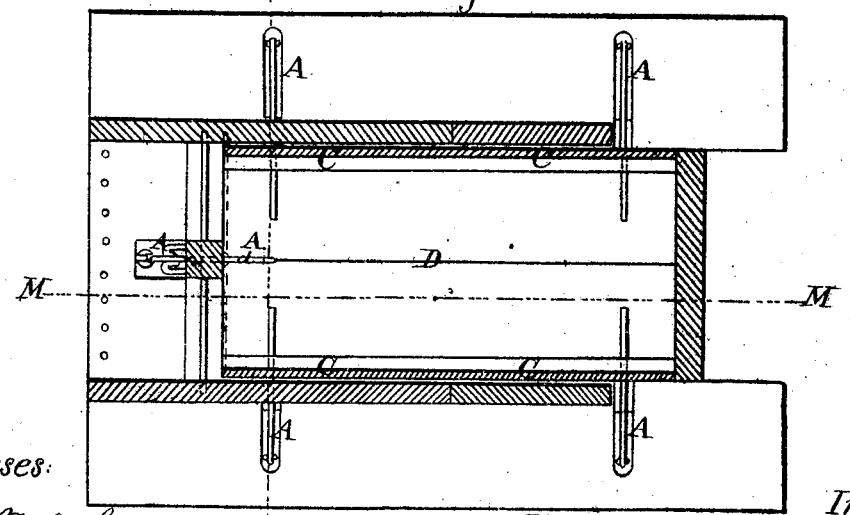
Figure 2 is a longitudinal elevation.

The nature of my invention consists in a box, as shown in all the views, on the inside of which is an automatic pitfall, working at the ends on journals in the end of the box, and marked $a$. This pitfall is made of two pieces, joined at the edge, and forming a right angle, so that when the trap is set, two of the pieces, one on either side, form a floor, upon which the rat or other animal stands, the other two, one on either side, standing upright, so that when bait or tempter is pulled, the floor drops from under the rat, and the upright wings close over it. The object is dropped on a wicker, suspended at the bottom, connected with pitfall by means of wires, attached to irons, which irons pass through the pitfall, and are marked $b$ in fig. 1 and fig. 5. The pitfall rests at one end on a spring, marked $c$ in fig. 5, to which the tempter, marked $d$, wherever shown, is attached. When the rat or other object falls on the wicker, marked E, its weight sets the trap again. The top of the trap is furnished with an additional siding, to protect the spring and tempter, so that the rat or other animal must approach it by passing over the pitfall. At the end is wire, to admit light.

What I claim as my invention, and desire to secure by Letters Patent, is—

The combination of pitfall A and wicker E, and spring C, in the manner and for the purpose substantially set forth.

ALLEN C. THOMAS.

Witnesses:
JOHN R. ZEHRUNG,
CORNELIUS THOMAS.